(12) United States Patent
Diefenbaugh et al.

(10) Patent No.: US 7,519,839 B2
(45) Date of Patent: Apr. 14, 2009

(54) METHOD FOR OPTIMIZING PLATFORM POWER DELIVERY

(75) Inventors: Paul S. Diefenbaugh, Portland, OR (US); Lilly Huang, Portland, OR (US); Bruce W. Rose, Aloha, OR (US); David Browning, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 11/244,495

(22) Filed: Sep. 30, 2005

(65) Prior Publication Data

US 2007/0079154 A1 Apr. 5, 2007

(51) Int. Cl.
*G06F 1/00* (2006.01)
(52) U.S. Cl. .................. 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 7,257,751 | B2 * | 8/2007 | Chung et al. | 713/300 |
| 7,346,787 | B2 * | 3/2008 | Vaidya et al. | 713/300 |
| 2006/0031690 | A1 * | 2/2006 | Chung et al. | 713/300 |
| 2006/0034212 | A1 * | 2/2006 | Mutch | 370/328 |
| 2006/0123252 | A1 * | 6/2006 | Vaidya et al. | 713/300 |
| 2007/0005987 | A1 * | 1/2007 | Durham et al. | 713/185 |
| 2007/0005995 | A1 * | 1/2007 | Kardach et al. | 713/300 |
| 2007/0005996 | A1 * | 1/2007 | Nalawadi et al. | 713/300 |
| 2007/0073896 | A1 * | 3/2007 | Rothman et al. | 709/232 |

\* cited by examiner

*Primary Examiner*—Abdelmoniem Elamin
(74) *Attorney, Agent, or Firm*—Blakely, Sokoloff, Taylor & Zafman LLP (57) ABSTRACT

Embodiments of the current invention describe an approach for configuring a platform resource table. The platform resource table is configured using information from both the platform management system and the platform resource provider system. The platform resource table is then communicated to the platform resource provider system via a platform interface to select and invoke platform state transitions to improve power efficiency.

20 Claims, 7 Drawing Sheets

*Sleepy Valley System Idle States*

| Platform Resources | | S0 | S0-I1 (Doze) | S0-I2 (Nap) | S0-I3 (Siesta) | S3 | S4 | S5 |
|---|---|---|---|---|---|---|---|---|
| Power Delivery | IMVP VR | <maximum> | <minimum> | <minimum> | <off> | <off> | <off> | <off> |
| | 5V VR | <maximum> | 3000mW | 2000mW | <minimum> | <minimum> | <minimum> | <off> |
| | 3V VR | <maximum> | 2000mW | 1200mW | 200mW | <minimum> | <minimum> | <off> |
| | 1.5V VR | <maximum> | 1500mW | 1000mW | 450mW | <minimum> | <minimum> | <off> |
| | : | : | : | : | : | : | : | : |
| | Entry/Exit Latency: | 0us\|0us | 1us\|10us | 2us\|250us | 5us\|500us | 10us\|750us | 10us\|750us | 10us\|1000us |
| Clocking | 133Mhz Clock | <on> | <on> | <off> | <off> | <off> | <off> | <off> |
| | 100Mhz Clock | <on> | <on> | <off> | <off> | <off> | <off> | <off> |
| | 48Mhz Clock | <on> | <on> | <on> | <off> | <off> | <off> | <off> |
| | 14Mhz Clock | <on> | <on> | <on> | <on> | <on> | <off> | <off> |
| | : | : | : | : | : | : | : | |
| | Entry/Exit Latency: | 0us\|0us | 0us\|0us | 1us\|50us | 1us\|100us | 50us\|1250us | 50us\|1500us | 50us\|1500us |

*Platform Power States* spans S0. *Sleepy Valley System Idle States* spans S0-I1, S0-I2, S0-I3, S3, S4, S5.

METHOD FOR OPTIMIZING PLATFORM POWER DELIVERY

BACKGROUND

1. Field

Embodiments of the present invention relate to the field of platform power delivery and management. In particular, some embodiments relate to the dynamic communication of information between power delivery and power management.

2. Discussion of Related Art

As the components of modern day computing systems continue to grow in functionality and complexity, computer designers and manufacturers are often faced with challenges associated with corresponding increases in energy consumption. For example, increased power consumption in a microprocessor tends to lead to a corresponding increase in temperature (which can negatively affect performance), increase the system's acoustic output (e.g. fan noise), and reduce battery life on mobile systems. Additionally, the energy available may be limited, and the efficiency at which power can be delivered to system components may vary significantly depending on the load and other conditions.

Existing models for communication between the platform management and resource delivery systems—for example between the processor and its voltage regulator and clock generator—typically rely on a limited set of hardware pins to control a discrete number of predetermined modes of operation. The predetermined modes of operation are coarse-grain, hard coded, and static. Therefore, the power usage is also hard coded and static and results in the inability to modify or shut down shared platform resources such as voltage regulators and clock generators without affecting all of the pins within the predetermined mode of operation. This further limits the frequency and scope of the interactions between the platform management and resource delivery systems.

DETAILED DESCRIPTION

Described herein are methods, an apparatus, and a system that includes a platform interface and a platform state table to dynamically communicate information between the power delivery system and the power management system. In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative and not restrictive of the current invention, and that this invention is not restricted to the specific constructions and arrangements shown and described because modifications may occur to those ordinarily skilled in the art. In other instances, well known semiconductor fabrication processes, techniques, materials, equipment, etc., have not been set forth in particular detail in order to not unnecessarily obscure embodiments of the present invention.

Figure 2:
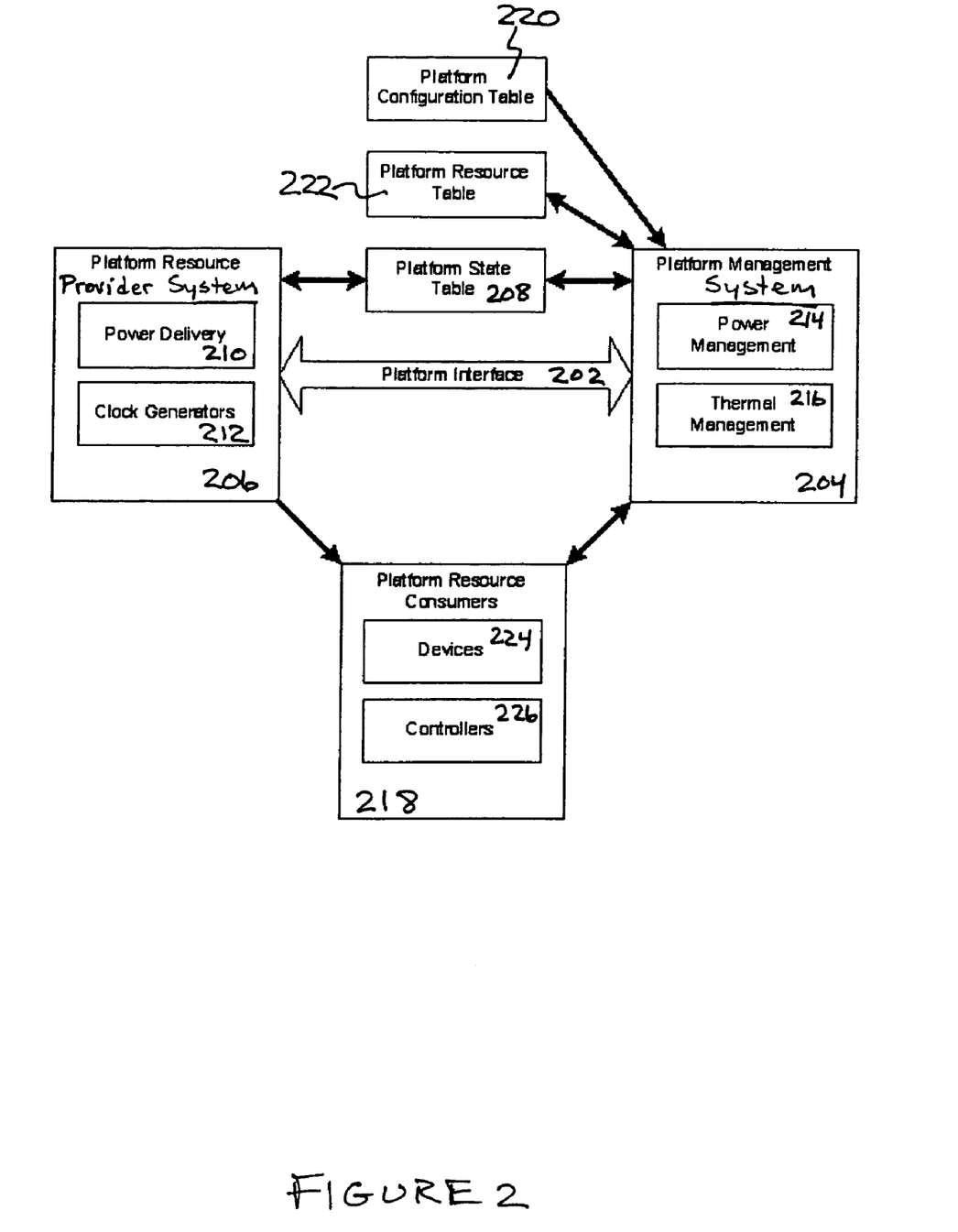
FIG. 2 is an illustration of a block diagram of an embodiment of a platform system.

A platform interface 202 between a platform management system 204 and a platform resource provider system 206 is provided in combination with a platform state table to use power wisely and efficiently and to allow fine-grain coordination and control of both the power consumers and power providers in a computing device. The platform interface 202 is an interface between the platform management module 204 and the platform resource providers 206 used to communicate information needed to build and configure the platform state table as well as invoke platform state transitions. The computing device may be a server, a desktop computer, a mobile device, or a wireless device including, for example, a laptop computer, a desktop computer, a palmtop computer, a tablet computer, a personal digital assistant, a pager, or a cellular telephone. In one particular embodiment, the computing device may be a laptop computer with a wireless communication module.

Embodiments of the current invention describe an approach for generating and configuring a shared platform state table within an interface between the platform management system 204 and the platform resource provider system 206. The platform state table 208 is based on information provided by the platform manufacturer/designer, platform resources (such as voltage regulators and clock generators 212), and platform management policies (such as the power management policies 214 and thermal management policies 216). The platform state table 208 is dynamically modified, communicated, and employed by the platform management policies within the platform management system 204 and by the platform resource provider system 206 to invoke state transitions in an effort to use power more intelligently and efficiently through various fine-grain techniques.

The platform interface 202 is both a communication mechanism (e.g. an electrical interface) and a protocol (commands, data format, etc. . . . ) between the platform resource provider system 206 and the platform management system 204. The platform state table 208 is built and configured from information obtained through this interface. The platform state table 208 describes which platform states exist. For example, the platform state table 208 informs both the platform resource provider system 206 and the platform management system 204 exactly what a specific state means and any associated dependencies or latencies of that specific state. The platform interface 202 is also used to initiate state transitions. For example, the platform interface 202 tells the resources within platform resource provider system 206 to go into a specific state, such as a sleep state, and when to resume to an operational state from a sleep state.

Figure 3:
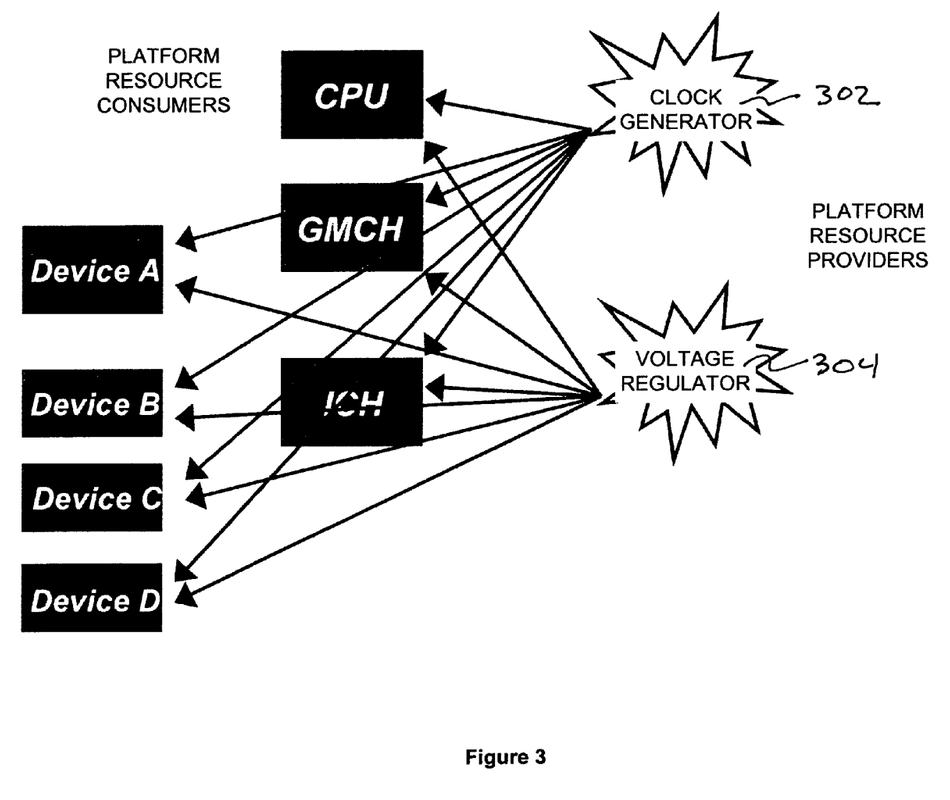
FIG. 3 is an illustration of a block diagram of the interaction between components of a platform system.

FIG. 3 illustrates one embodiment of the relationship of the platform resource provider system 206, in this example a clock generator 302 and voltage regulator (VR) 304, with the platform components. The platform components in FIG. 3 include devices A through D, the central processing unit (CPU), and a chipset that includes the GMCH (Graphics and Memory Controller Hub) and the ICH (I/O Controller Hub). Examples of the devices include mass storage devices such as a hard disk drive, networking devices such as a wireless network adapter, human input devices such as a keyboard or mouse, and display devices such as an integrated flat panel.

Figure 1:
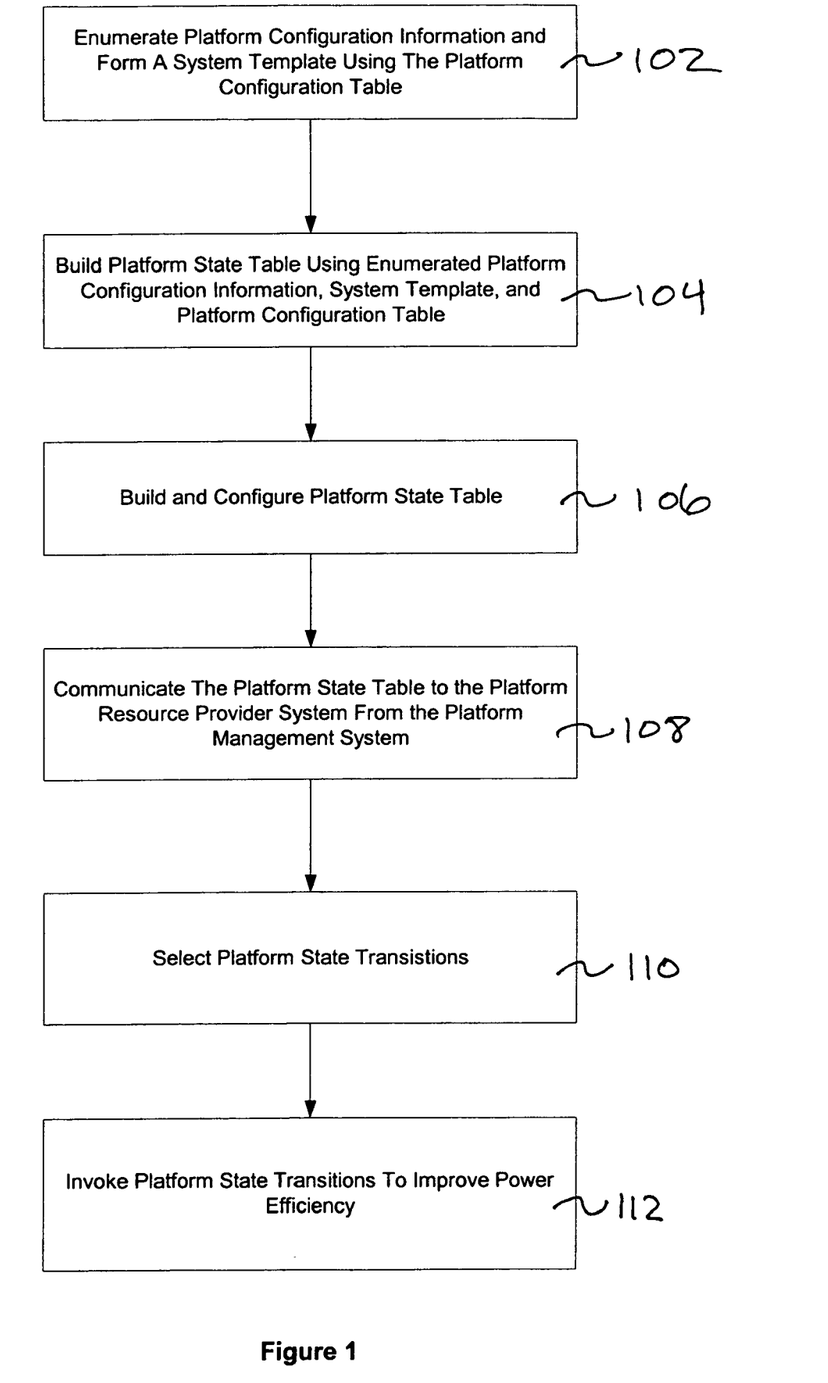
FIG. 1 is an illustration of a flow chart of an embodiment of the current invention.

FIG. 1 is one embodiment of a flow-chart for a computer implemented method using a platform interface 202 in combination with a platform state table 208 to dynamically communicate information between the platform management system 204 and a platform resource provider system 206. FIG. 2 illustrates the relationship between the components for generating, configuring, communicating, and using the platform state table 208 and the platform interface 202. Blocks 102, 104, and 106 of FIG. 1 describe a method of creating a platform state table within a platform management system 204. At block 102 platform configuration information is enumerated within a platform configuration table 220 and a system template is formed. The platform configuration table 220 is enumerated to understand the basic system layout, high-level mappings between resource providers and resource consumers, and to gain a template for certain types of platform-level states (e.g. Sx). This information would typically be provided by the system manufacturer (OEM) or designer (ODM) through an interface such as system BIOS (e.g. an ACPI Control Method).

The platform resources and associated characteristics are enumerated using information received from the platform resource provider system 206. This information is integrated into the platform management system 204. Enumerating the platform resources includes determining which resources are controllable, identifying the meaningful properties of each controllable action (e.g. transitional latencies), and completing all mappings between resource consumers and providers. This involves identifying the power rails within the power delivery system 210 and the clock resources within the clock generation system 212 and determining which devices 218 the power delivery system 210 and the clock generation system 212 are connected to. For example, a list of the voltage regulator (VR) power rails that exist and can be turned on/off or adjusted to different power efficiency modes. Similarly, a list of which clock sources exist and can be turned on/off or adjusted to a different output frequency can be determined. Meaningful information for each controllable mode of operation for each resource can also be determined, including limitations (e.g. ability to handle transient or sustained power demands in each VR mode), and transitional behavior (e.g. latency to switch between modes).

At block 104 the platform resource table 222 is built by the platform management system 204 using the enumerated platform configuration information, system template, and platform configuration table 220. The platform resource table 222 lists the platform resources, their general characteristics, and provides a general topology of the system, mapping resources and consumers. Templates for static and certain pseudo-static states will likely be defined in the platform configuration table 220 by the system manufacturer or designer and provided through a system level interface such as BIOS. For example, system sleeping states and idle states are only templates. Platform policy will use this information to define the real states in the platform resource table. The platform resource table can be communicated with the system resources to fill in additional details, thereby allowing system resources to agree on state definitions, understand the systems expectations, and contribute information regarding the resources behavior and constraints on a state-by-state basis. This give the platform the ability to define, tune and use states dynamically.

Figure 6:
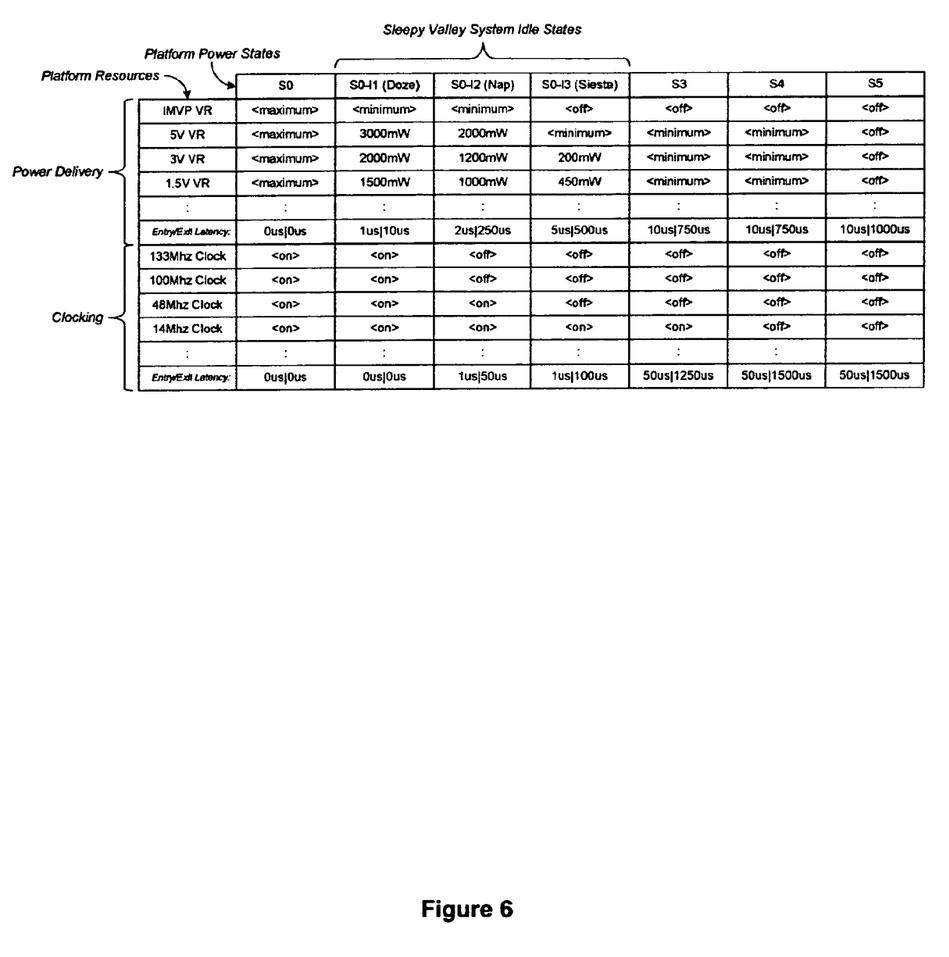
FIG. 6 is an illustration of an embodiment of a platform state table.

At block 106 the platform state table 208 is built and configured by the platform management system 204. The platform state table 208 is built and configured using information from the platform configuration table 220, the platform resource table 222, and the platform policies such as the power management policies 214 and the thermal management policies 216. Configuring the platform resource table also involves defining the platform states from information received from the afore mentioned sources. In one embodiment, the platform states are defined from information received from the platform management system 204. Specific platform states are identified as one of a static state, a pseudo-static state, or a dynamic state. An example of a static state is a system sleep state. System sleep states are typically modes that are pre-defined by the OEM at system design time. Pseudo-static states are typically states that are defined at boot-up. One example of a pseudo-static state is the creation of idle windows that maximize the benefit of existing idle power management techniques by aligning and quiescing device activity to produce longer and more deterministic periods of system-wide idleness. FIG. 6 illustrates one particular example of this type of pseudo-static state idle window 602. Also, the template of the topology may be used by the platform interface 202 to configure the platform resource table 208. The enumeration of the platform shared resources may be performed statically (e.g. provided as part of the platform configuration table) or dynamically at run-time (e.g. linkage discovered during enumeration of platform resources, consumers, and policies) given a robust enough interface and intelligent resources.

Figure 5:
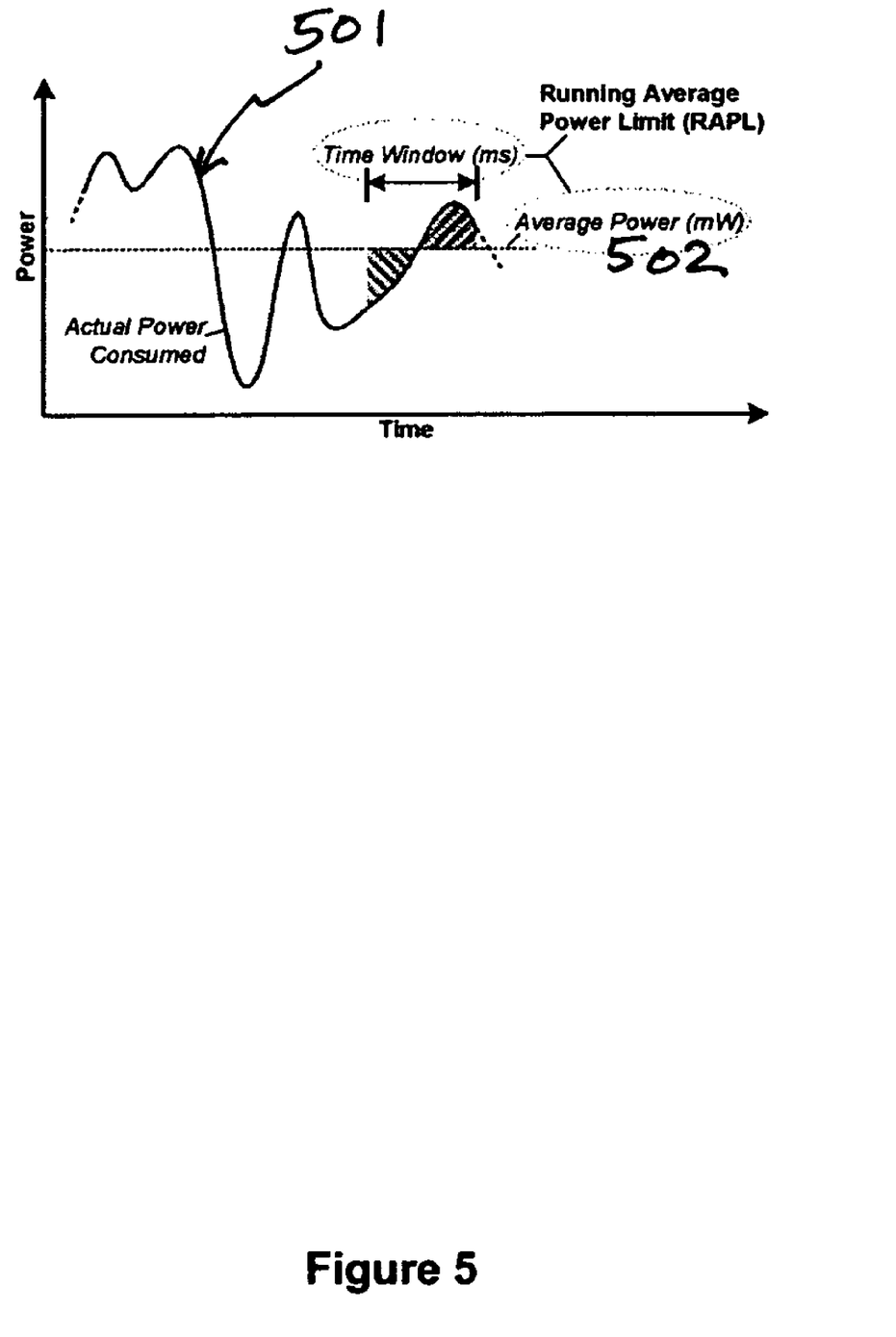
FIG. 5 is an illustration of an embodiment of a dynamic state running average power limit.

Dynamic states are those that are defined or at least tuned dynamically during run-time depending on battery life or thermal conditions. An example of a dynamic state is the implementation of Running Average Power Limits (RAPL) as illustrated by the graph in FIG. 5 of power versus time for a device. The illustrated curve 501 has an average power level 502 and an adjustable time window $w_1$, where $w_1$ defines the amount of time for maintaining the average power consumption of the device at or below the average power level 502. The average power level 502 and the time window $w_1$ can therefore be viewed as a thermal running average power limit that, in one example, may be determined based on the thermal influence of the device on one or more other devices. Thus, $w_1$, could be narrowed in response to detection of an overheating condition in a nearby device. Narrowing $w_1$, can provide tighter control over device power consumption. This capacity for tighter control may become part of the platform resource table that is used to communicate information between the platform resource providers 206 and the platform management module 204 to optimize power efficiency. The definition of the platform states is performed such that valid mappings between platform power management states and the corresponding expectations, behavior, and constraints of platform resources are clearly articulated. This correlation may be done either statically or dynamically depending on the robustness of the implementation.

The platform state table 208 is communicated to the platform resource provider system 206 from the platform management system 204 at block 108. This is done using the platform interface 202. This communication allows intelligent platform resources to participate in the state definitions of the platform state table 208, e.g. specifying information such as latencies. Transitional latency information may be obtained about the specific platform states. Transitional latency information is information on the entry and exit latency periods. The transitional latency information is valuable in the determination of which state may be invoked to optimize power efficiency based on how much time is required to transition in and out of the state and whether the window of time available for the invocation of a more efficient power state is sufficient. Information on the transitional latencies provides the platform shared resources with the ability to more accurately and dynamically respond to platform management module by conveying explicit details such as entry/exit latencies based upon the specific properties of each defined state.

Usage constraints of specific platform states may also be obtained from the platform resource provider system 206. Information on the transitional latencies provides the platform shared resources with the ability to more accurately and dynamically respond to platform management module by conveying explicit details such as entry/exit latencies based upon the specific properties of each defined state. Similar to information on the transitional latencies, information on usage constraints of the specific platform states provides the platform shared resources such as the power delivery 210 and the clock generators 212 with the ability to more accurately and dynamically respond to the platform management system 204 by conveying explicit details about the usage constraints of specific platform states.

At block 110 platform state transitions are selected using the platform state table 208 and at block 112 the platform state table 208 is used to invoke platform state transitions to improve power efficiency.

There is the potential to loop back to block 102 and revise the platform state table 208 whenever a meaningful change occurs in consumption (e.g a new device or subsystem is inserted or activated), delivery (e.g A/C is plugged in), or policy (e.g a thermal event.)

In one example, information within the platform resource table 208 may communicate the template of the topography of the power delivery system 210 and of the clock system 212 to the platform management module 204. With the template of the topography, the platform management module knows where to look to find information on different elements of the platform shared resources. The platform management module may then determine which available specific platform states would be the most power efficient. This determination may also take into consideration the effects of the specific power state on minimizing thermal contributions of the specific platform state. This allows for fine-tuning of the power management policy and for the dynamic invoking of platform state transitions based on that information.

Platform state transitions are then invoked to optimize power efficiency. In an embodiment, Running Average Time Limit (RAPL) has the ability to implement fine-grain control of device power consumption while maximizing performance. Improvements in the run-time efficiency of power delivery systems should also be possible when devices are active but consuming power at a level that is meaningfully and reliably below their maximum, thereby expanding the use of the platform interface for non-idle workloads. For example, a CPU may be restricted in its running average power consumption (e.g. 10 W integrated over a 100 ms window) in accordance to heightened platform thermal and/or battery life constraints.

Figure 4:
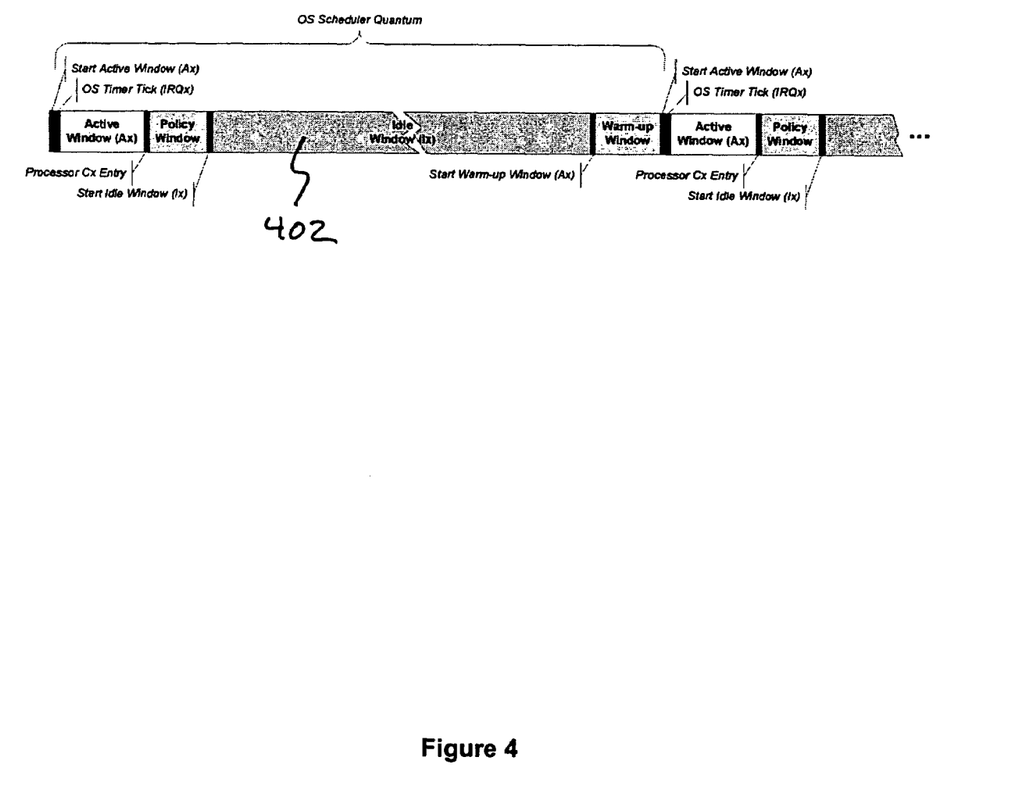
FIG. 4 is an illustration of a pseudo-static state idle window.

In another embodiment, platform state transitions are invoked using information about the available pseudo-static states. FIG. 4 is an example of a platform resource table 208 that includes the power delivery and clocking constraints and transitional latencies for both pseudo-static states (S0-I1, S0-I2, and S0-I3) and for static sleep states (S0, S3, S4, and S5.) This platform resource table 208 would be built using the aforementioned platform interface 202 to communicate information between the power management policy 214 and the platform power delivery system 210 and the platform clock system 212. The power management policy 214 would use the exit latency information to warm-up a VR power rail within the power delivery system 210 and the clock resources within the clock system 212 immediately prior to the start of the next active window, thereby hiding all transitional overhead from the operating system (OS) and the applications. The power management policy 214 would also use the platform resource table 208 to more intelligently determine which system idle state to employ during each policy window. For example, the power management policy 214 may determine to not send Nap (S0-I2) transition events to the power delivery system 210 when the expected state residency is below 1 ms (given this resource's relatively large exit latency of 250 us) but continue to utilize clocking transitions (given this resource's much lower exit latency of 50 us.)

The number and type of resources within the platform state table 208 will likely be provided by the manufacturer or designer as part of the platform configuration table 220. The characteristics and behavior of each resource would be discovered via the platform interface and stored in the platform resource table 222. The platform states would be created by platform policies using templates provide in the platform configuration table 220, the platform resource table 222, and likely other information. Intelligent platform resources can contribute additional details per state (e.g. transitional latencies) and use these state definitions to invoke transitions (e.g. platform policy requests the VR power rail to enter the "S0-I2" state over the platform interface and the definition of what "S0-I2" means is provided in the platform state table 208.)

In a similar manner, run-time (active) power and thermal management policies may employ Running Average Power Limits (RAPL) on one or more devices residing on a given power VR rail. An additional S0-like state could be dynamically defined in the platform resource table 208 by these polices to convey meaningfully lower power consumption on the effected VR rails, for example where the expected load is decreased from the maximum possible load (e.g. 20 W) to a deterministically-controlled average power load of no more than 5 W. A robust VR implementation could use this information to tune its internal operation and thereby deliver better efficiency in low-load conditions.

The implications for platform power delivery is that in order to minimize power loss due to power conversion we want to synchronize voltage regulator (VR) performance to the power consumption guidance provided by platform power management policies 214. It is assumed that a certain class of VR participating in this model may support multi-modal operation with at least two distinguishing modes, where each is designed to optimize power efficiency for a specific range of power consumption. The platform management module could benefit by knowing about these ranges of efficiencies and by allowing power consumption to be fine-tuned when possible to align with the nearest and highest efficiency state. For example, a RAPL limit might be decreased slightly (e.g. from 5 W to 4.5 W) to align power consumption with a higher-efficiency mode in the VR (e.g. from 70% to 5 W to 85% at 4.5 W.) Details of any supported efficiency modes should therefore be exposed as part of the power delivery system's behavior and constraints. Another class of VR power rails could benefit from the deterministic power consumption information provided in the platform resource table 208 and expected state residency information provided as part of each state transition. This information would allow the VR to quickly and effectively fine-tine its behavior at the time of a state transition to deliver optimal efficiency for the given state.

Figure 7:
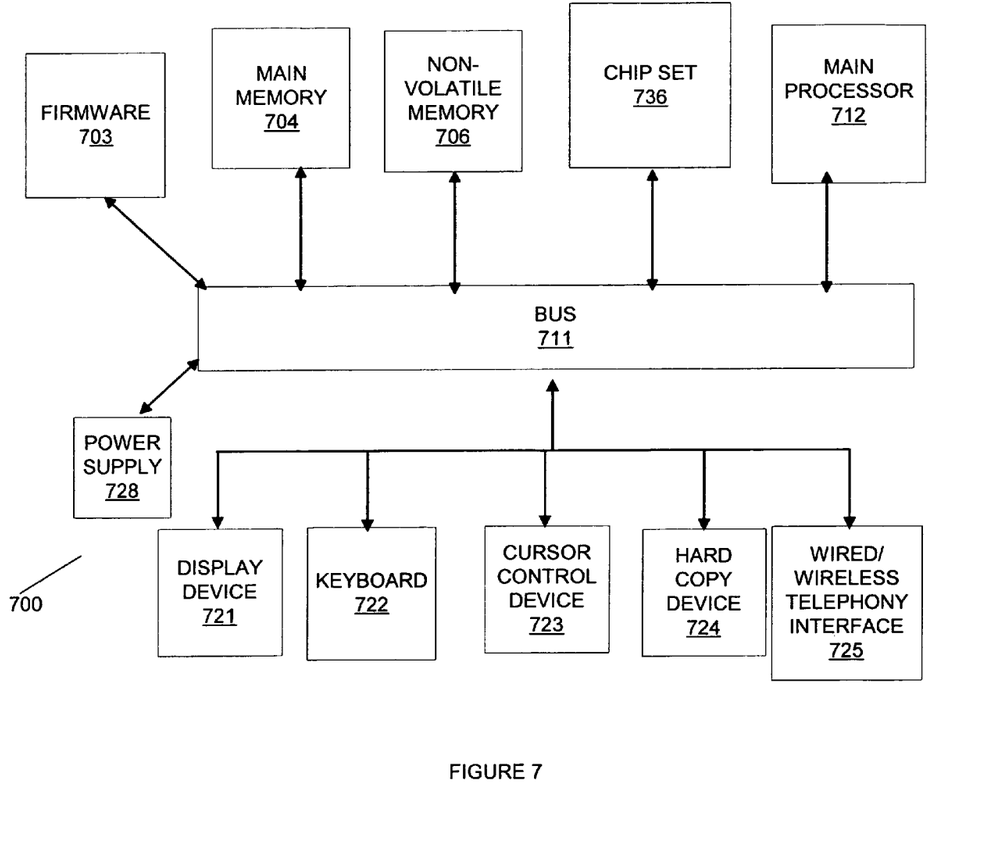
FIG. 7 is an illustration of an embodiment of a computing system.

FIG. 7 illustrates a block diagram of an example computer system that may use an embodiment of the approach to configure a platform resource table within a platform interface between a platform management module and a platform resource providers and communicating the platform resource table dynamically to the platform management module and the platform resources module to invoke platform state transitions to optimize platform power efficiency. In one embodiment, computer system 700 comprises a communication mechanism or bus 711 for communicating information, and an integrated circuit component such as a processor 712 coupled with bus 711 for processing information. One or more of the components or devices in the computer system 700 such as the processor 712 or a chip set 736 may use an embodiment of the approach to configure a platform resource table within a platform interface between a platform management module and a platform resource providers and communicating the platform resource table dynamically to the platform management module and the platform resources module to invoke platform state transitions to optimize platform power efficiency.

Computer system 700 further comprises a random access memory (RAM) or other dynamic storage device 704 (referred to as main memory) coupled to bus 711 for storing information and instructions to be executed by processor 712. Main memory 704 also may be used for storing temporary variables or other intermediate information during execution of instructions by processor 712. Firmware 703 may be a combination of software and hardware, such as Electronically Programmable Read-Only Memory (EPROM) that has the operations for the routine recorded on the EPROM. The firmware 703 may embed foundation code, basic input/output system code (BIOS), or other similar code. The firmware 703 may make it possible for the computer system 900 to boot itself.

Computer system 700 also comprises a read-only memory (ROM) and/or other static storage device 706 coupled to bus 711 for storing static information and instructions for processor 712. The static storage device 706 may store OS level and application level software.

Computer system 700 may further be coupled to a display device 721, such as a cathode ray tube (CRT) or liquid crystal display (LCD), coupled to bus 711 for displaying information to a computer user. A chipset, such as chipset 736, may interface with the display device 721.

An alphanumeric input device (keyboard) 722, including alphanumeric and other keys, may also be coupled to bus 711 for communicating information and command selections to processor 712. An additional user input device is cursor control device 723, such as a mouse, trackball, trackpad, stylus, or cursor direction keys, coupled to bus 711 for communicating direction information and command selections to processor 712, and for controlling cursor movement on a display device 712. A chipset, such as chipset 736, may interface with the input output devices.

Another device that may be coupled to bus 711 is a hard copy device 724, which may be used for printing instructions, data, or other information on a medium such as paper, film, or similar types of media. Furthermore, a sound recording and playback device, such as a speaker and/or microphone (not shown) may optionally be coupled to bus 711 for audio interfacing with computer system 700. Another device that may be coupled to bus 711 is a wired/wireless communication interface 725.

Computer system 700 has a power supply 728 such as a battery, AC power plug connection and rectifier, etc.

In one embodiment, the software used to facilitate the routine can be embedded onto a machine-readable storage medium. A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM) including firmware; random access memory (RAM); magnetic disk storage media; optical storage media; flash memory devices; etc.). In contrast, a machine-readable transmission medium may include electrical, optical, acoustical or other form of propagated signals (e.g., carrier waves, infrared signals, digital signals, etc.); etc.

Several embodiments of the invention have thus been described. However, those of ordinary skill in the art will recognize that the invention is not limited to the embodiments described, but can be practiced with modification and alteration within the scope and spirit of the appended claims that follow.

We claim:

1. A method, comprising:
    configuring a platform state table within a platform management system using information received from a platform configuration table and a platform resource table; and
    communicating the platform state table to a platform resource provider system, the platform resource provider system providing further information to the platform state table; and
    invoking platform state transitions to improve power efficiency.

2. The method of claim 1, wherein configuring the platform state table comprises enumerating shared platform resources from information received from the platform resource provider system and defining platform states from information received from the platform management system.

3. The method of claim 2, wherein defining platform states from information received from the platform management system further comprises identifying specific platform states as one of a static state, a pseudo-static state, or a dynamic state.

4. The method of claim 3, wherein defining platform states from information received from the platform resource provider system further comprises obtaining transitional latency details of the specific platform states.

5. The method of claim 3, wherein defining platform states from information received from the platform management system further comprises obtaining usage constraints of specific platform states.

6. The method of claim 2, wherein enumerating shared platform resources from information received from the platform resource provider system comprises determining which platform resources are controllable.

7. The method of claim 2, wherein enumerating shared platform resources from information received from the platform resource provider module comprises determining behavior and constraints of a power delivery system and behavior and constraints of a clock system.

8. An apparatus, comprising:
    a processor;
    a memory coupled to the processor, the memory to store information on shared platform resources and information on platform policies;
    a platform resources module coupled to the memory to provide information on the shared platform resources to the memory;
    a platform management system coupled to the memory to provide information on the platform policies to the memory; and a platform interface coupled to a platform resource provider system and to a platform management system to receive a platform state table from the platform management system.

9. The apparatus of claim 8, further comprising devices coupled to the platform management system and the platform resource provider system.

10. The apparatus of claim 8, wherein the platform interface is coupled to the platform resources module and to the platform management module to dynamically communicate the platform resource table to the platform resources module and to the platform management module.

11. The apparatus of claim 8, wherein the apparatus is a laptop computer with a wireless communication module.

12. An apparatus, comprising:
  a means for configuring a platform state table based on information received from a platform management system;
  a means for communicating the platform resource table to a platform resource provider system; and
  a means for invoking platform state transitions.

13. The apparatus of claim 12, further comprising a means for enumerating shared platform resources.

14. The apparatus of claim 12, further comprising a means for selecting platform state transitions to be invoked.

15. A system, comprising:
  a processor; and
  a memory coupled to the processor to store instructions, which when executed from the memory causes the processor to configure a platform state table within a platform management system using information received from a platform configuration table and a platform resource table, communicating the platform state table to a platform resource provider system, the platform resource provider system providing further information to the platform state table and invoking platform state transitions to improve power efficiency.

16. The system of claim 15, wherein the platform management system comprises power management policy and thermal management policy.

17. The system of claim 15, wherein the platform resource provider system comprises a VR power rail and clock sources.

18. A machine-readable storage medium having executable code to cause a computing device to perform a method for power management, comprising:
  configuring a platform state table within a platform management system; and
  communicating the platform state table to a platform resource provider system, the platform resource provider system providing further information to the platform state table.

19. The machine-readable storage medium having executable code to cause the computing device to perform the method for power management of claim 18, further comprising selecting platform state transitions.

20. The machine-readable storage medium having executable code to cause the computing device to perform the method for power management of claim 18, further comprising invoking platform state transitions to improve power efficiency.

* * * * *